(12) United States Patent
Imai

(10) Patent No.: US 11,045,732 B2
(45) Date of Patent: Jun. 29, 2021

(54) NON-TRANSITORY COMPUTER READABLE STORAGE MEDIUM STORING IMAGE PROCESSING PROGRAM, IMAGE PROCESSING METHOD, AND IMAGE PROCESSING DEVICE

(71) Applicant: KOEI TECMO GAMES CO., LTD., Kanagawa (JP)

(72) Inventor: Shogo Imai, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 105 days.

(21) Appl. No.: 16/210,368

(22) Filed: Dec. 5, 2018

(65) Prior Publication Data
US 2019/0209922 A1 Jul. 11, 2019

(30) Foreign Application Priority Data
Jan. 9, 2018 (JP) ............................. JP2018-001355

(51) Int. Cl.
*A63F 13/52* (2014.01)
*A63F 13/577* (2014.01)
(Continued)

(52) U.S. Cl.
CPC ............ *A63F 13/52* (2014.09); *A63F 13/577* (2014.09); *G06T 15/20* (2013.01); *G06T 19/20* (2013.01);
(Continued)

(58) Field of Classification Search
None
See application file for complete search history.

(56) References Cited

U.S. PATENT DOCUMENTS 6,126,545 A * 10/2000 Takahashi ............... A63F 13/10 463/32
6,244,959 B1 * 6/2001 Miyamoto ............... A63F 13/06 463/31
(Continued)

FOREIGN PATENT DOCUMENTS

JP 4226663 2/2009

OTHER PUBLICATIONS

YouTube video:Tomb Raider 2 Roof Glitch, Aug. 23, 2010, screen shot of first page. <<https://www.youtube.com/watch?v=MtJVnFXQshY>> (Year: 2010).*

*Primary Examiner* — Jay Trent Liddle
*Assistant Examiner* — Alex P. Rada, II
(74) *Attorney, Agent, or Firm* — IPUSA, PLLC

(57) ABSTRACT

There is provided a non-transitory computer readable storage medium storing an image processing program, which when executed causing an image processing device to execute the following steps: receiving an operation for moving a position of a predetermined object in a virtual three-dimensional space; in response to determining that a height of a lowermost part of the predetermined object is less than a height of a surface of a predetermined three-dimensional object, configuring the predetermined object to be movable in a range with a height that is greater than or equal to a predetermined height corresponding to the position on a horizontal plane in the virtual three-dimensional space; and causing the predetermined object to be displayed on or above another object in the virtual three-dimensional space.

6 Claims, 8 Drawing Sheets

(51) Int. Cl.
  *G06T 15/20* (2011.01)
  *G06T 19/20* (2011.01)
(52) U.S. Cl.
  CPC ..... *A63F 2300/643* (2013.01); *A63F 2300/66* (2013.01); *G06T 2210/21* (2013.01); *G06T 2219/2016* (2013.01)

(56) References Cited

U.S. PATENT DOCUMENTS 6,354,944 B1 * 3/2002 Takahashi ............... A63F 13/10
                                                         463/32
6,657,630 B1   12/2003 Kurosawa et al.

\* cited by examiner

NON-TRANSITORY COMPUTER READABLE STORAGE MEDIUM STORING IMAGE PROCESSING PROGRAM, IMAGE PROCESSING METHOD, AND IMAGE PROCESSING DEVICE

CROSS-REFERENCE TO RELATED APPLICATION

The present application is based on and claims priority to Japanese Patent Application No. 2018-001355 filed on Jan. 9, 2018, the entire content of which is hereby incorporated herein by reference.

BACKGROUND OF THE INVENTION

1. Field of the Invention

The present disclosure relates to a non-transitory computer readable storage medium storing an image processing program, an image processing method, and an image processing device.

2. Description of the Related Art

For a computer game or simulation, a technique has been known such that, using three-dimensional computer graphics, an object, such as a character operated by a user, is displayed, while the object is allowed to be moved in a virtual three-dimensional space.

In this technique, for example, a polygon surface is defined by position coordinates of a plurality of vertices and one normal vector. Using polygon data including data defining a plurality of polygon surfaces defined as described above, a landform is represented by the plurality of polygon surfaces finely partitioned. A method has been known in which a grounding position of an object is determined, so that a lowermost part of an object, such as a wheel or a leg, is placed on a polygon surface (see Patent Document 1 (Japanese Patent No. 4226663), for example).

A problem with the method described in Patent Document 1 is that use of a memory is required for reading polygon data, etc., for determining the grounding position, and that a processing cost of a processor increases.

There is need for a technique with which a lowermost position of an object in a surrounding environment can be relatively accurately determined in a virtual three-dimensional space, while reducing a processing load.

SUMMARY OF THE INVENTION

According to an aspect of the present disclosure, there is provided a non-transitory computer readable storage medium storing an image processing program, which when executed causing an image processing device to execute the following steps: receiving an operation for moving a position of a predetermined object in a virtual three-dimensional space; in response to determining that a height of a lowermost part of the predetermined object is less than a height of a surface of a predetermined three-dimensional object, configuring the predetermined object to be movable in a range with a height that is greater than or equal to a predetermined height corresponding to the position on a horizontal plane in the virtual three-dimensional space; and causing the predetermined object to be displayed on or above another object in the virtual three-dimensional space.

According to an embodiment, a technique can be provided with which a lowermost position of an object in a surrounding environment can be relatively accurately determined in a virtual three-dimensional space, while reducing a processing load.

Other objects, features and advantages of the present invention will become more apparent from the following detailed description when read in conjunction with the accompanying drawings.

DETAILED DESCRIPTION OF THE PREFERRED EMBODIMENTS

In the following, embodiments of the present disclosure are described based on the drawings.

<Hardware Configuration>

Figure 1:
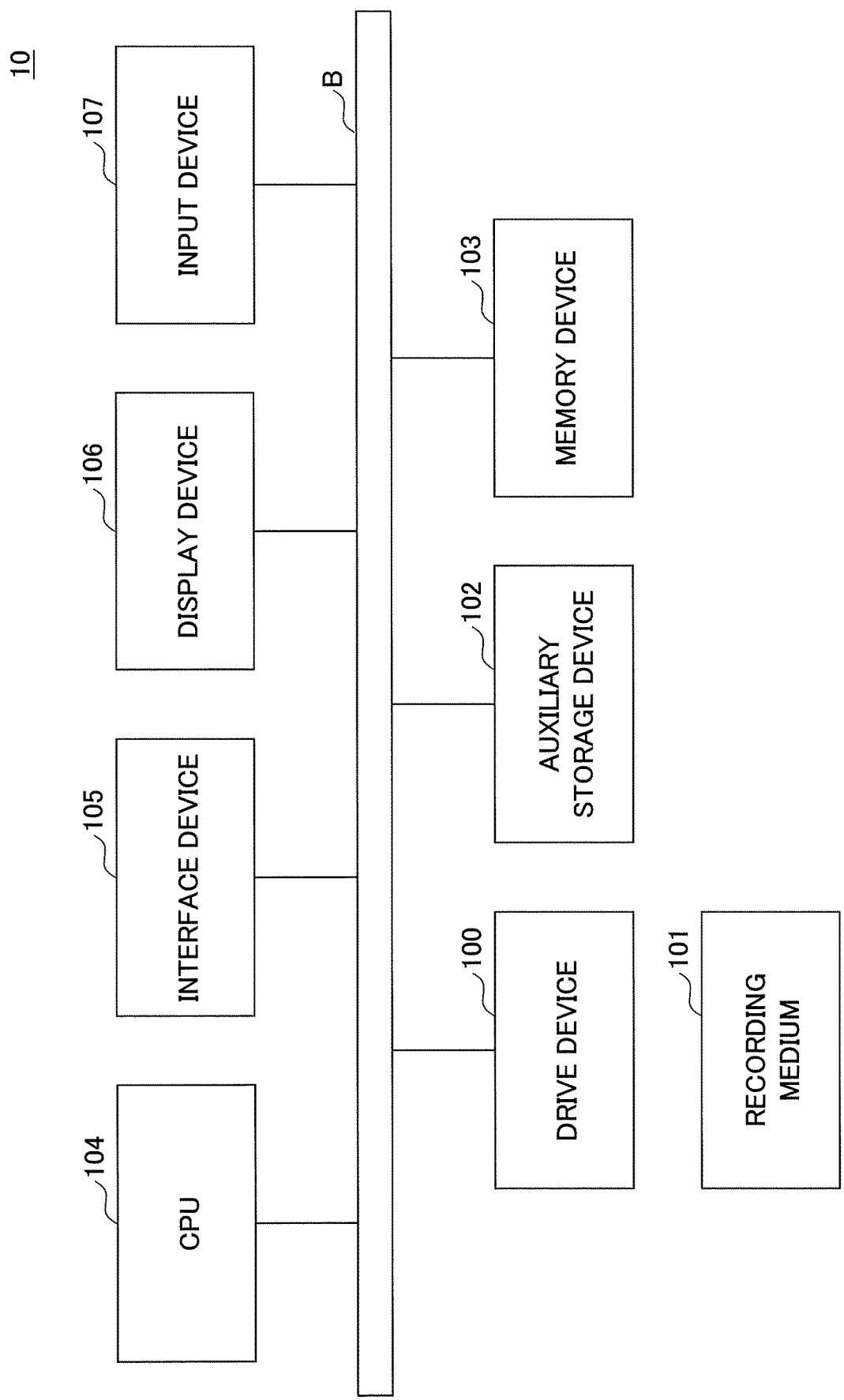
FIG. 1 is a diagram illustrating an example of a hardware configuration of an image processing device according to an embodiment.

FIG. 1 is a diagram illustrating an example of a hardware configuration of an image processing device 10 according to an embodiment. The image processing device 10 illustrated in FIG. 1 is provided with a drive device 100; an auxiliary storage device 102; a memory device 103; a central processing unit (CPU) 104; an interface device 105; a display device 106; an input device 107, etc., which are mutually connected through a bus B.

A game program for implementing a process in the image processing device 10 is distributed by using a recording medium 101. Upon detecting that the recording medium 101 storing a game program is attached to the drive device 100, the image processing device 10 installs the game program into the auxiliary storage device 102 from the recording medium 101 through the drive device 100. However, it is not required to perform installation of the game program using the recording medium 101. For example, the game program may be downloaded from another computer through a network. The auxiliary storage device 102 stores the installed game program, and the auxiliary storage device 102 stores necessary files, data, etc.

In response to detecting a command for activating a program, the memory device 103 reads out the program from the auxiliary storage device 102, and the memory device 103 stores the program in the memory device 103 itself. The CPU 104 implements a function of the image processing device 10 according to a program stored in the memory device 103. The interface device 105 is used as an interface for connecting to a network. The display device 106 displays a graphical user interface (GUI), etc., of a program. The input device 107 is formed of a controller, a keyboard, a mouse, etc.; or a touch panel, a button, etc. The input device 107 is used for inputting various operation commands.

As examples of the recording medium 101, there are portable recording media, such as a compact disk read-only memory (CD-ROM), a digital versatile disc (DVD), a Blue-ray disc, and a universal serial bus (USB) memory. As examples of the auxiliary storage device 102, there are a hard disk drive (HDD), a solid state drive (SSD), a flash memory, etc. Each of the recording medium 101 and the auxiliary storage device 102 corresponds to a computer-readable recording medium.

<Functional Configuration>

Figure 2:
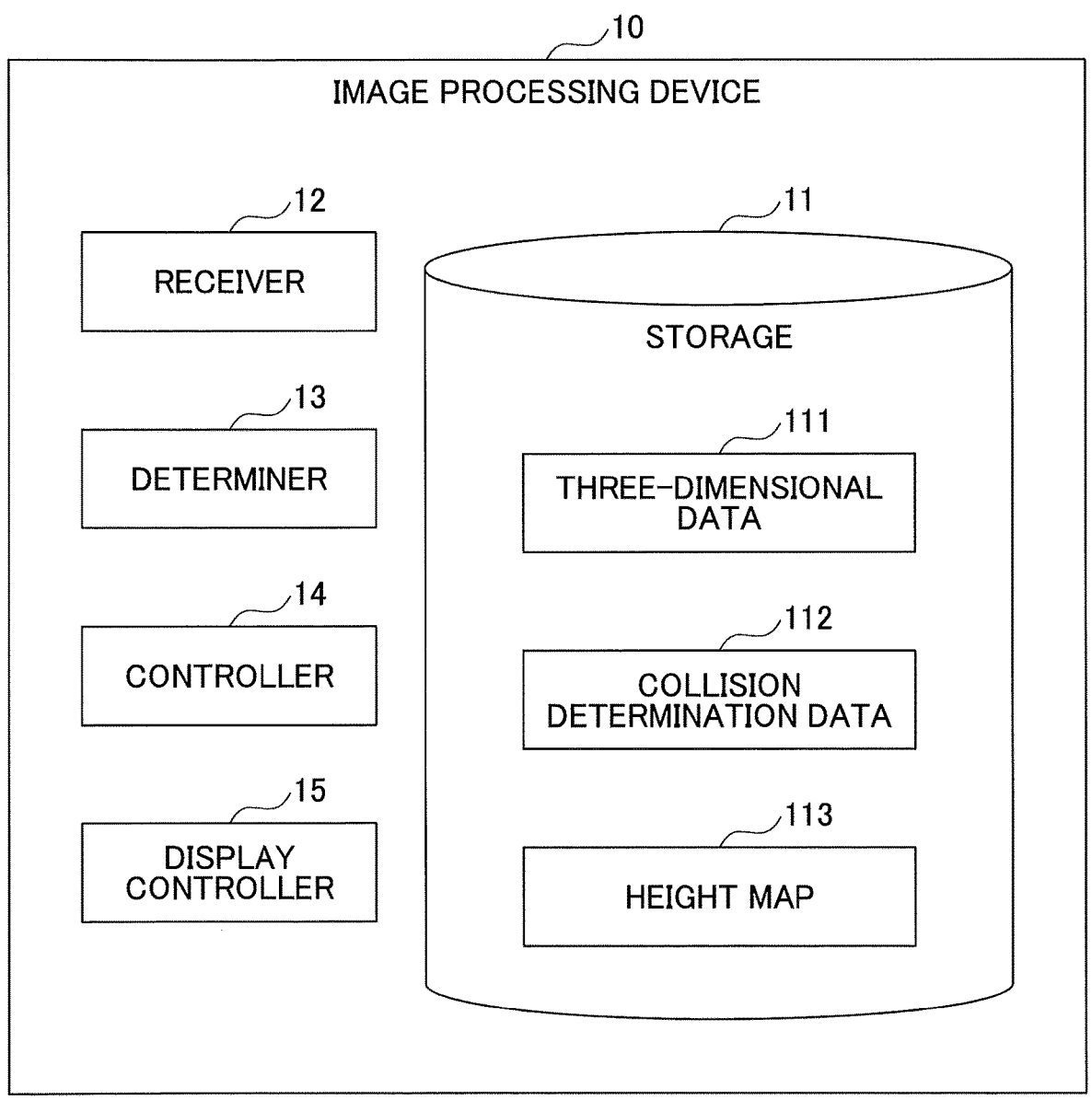
FIG. 2 is a diagram illustrating an example of functional blocks of the image processing device according to an embodiment.

Next, an example of a functional configuration of the image processing device 10 is described by referring to FIG. 2. FIG. 2 is a functional block diagram of the image processing device 10 according to an embodiment.

The image processing device 10 includes a storage 11. The storage 11 is implemented, for example, using the auxiliary storage device 102, etc. The storage 11 stores three dimensional data 111; collision determination data 112; a height map 113; etc. The three-dimensional data 111 is data of three-dimensional models of respective objects. The collision determination data 112 is data representing a surface of a three-dimensional object, which represents an approximate shape of an object in a virtual three-dimensional space. The height map 113 is data representing a height (a position in a vertical direction) corresponding to each position in a horizontal direction and a depth direction (horizontal plane) of an object provided with a top surface having a relatively complicated shape, among objects in the virtual three-dimensional space. Examples of the collision determination data 112 and the height map 113 are described below.

Additionally, the image processing device 10 is provided with a receiver 12; a determiner 13; a controller 14; and a display controller 15. Each of these units is implemented by one or more programs installed in the image processing device 10 by causing the CPU 104 of the image processing device 10 to execute a process.

The receiver 12 receives, from a user, an operation for moving a player character in the virtual three-dimensional space, etc.

The determiner 13 determines whether a player character collides with collision determination data, which is described below, by an operation, etc., received by the receiver 12.

Additionally, upon detecting that a player character collides with collision determination data and height data corresponding to a position of the player character on the horizontal plane is not defined in the height map 113, the determiner 13 determines that a height of a lowermost part of the player character is a height of the collision detection data. Additionally, upon detecting that a player character collides with the collision determination data and height data corresponding to a position of the player character on the horizontal plane is defined in the height map 113, the determiner 13 determines that a height of a lowermost part of the player character is the height defined in the height map 113.

The controller 14 controls progression, etc., of a game. Additionally, in response to an operation, etc., received by the receiver 12, the controller 14 configures a player character to be movable within a range with a height that is greater than or equal to the height determined by the determiner 13 in the virtual three-dimensional space.

The display controller 15 displays an image in a game on a screen in accordance with an indication from the controller 14.

<Process>

Figure 3:
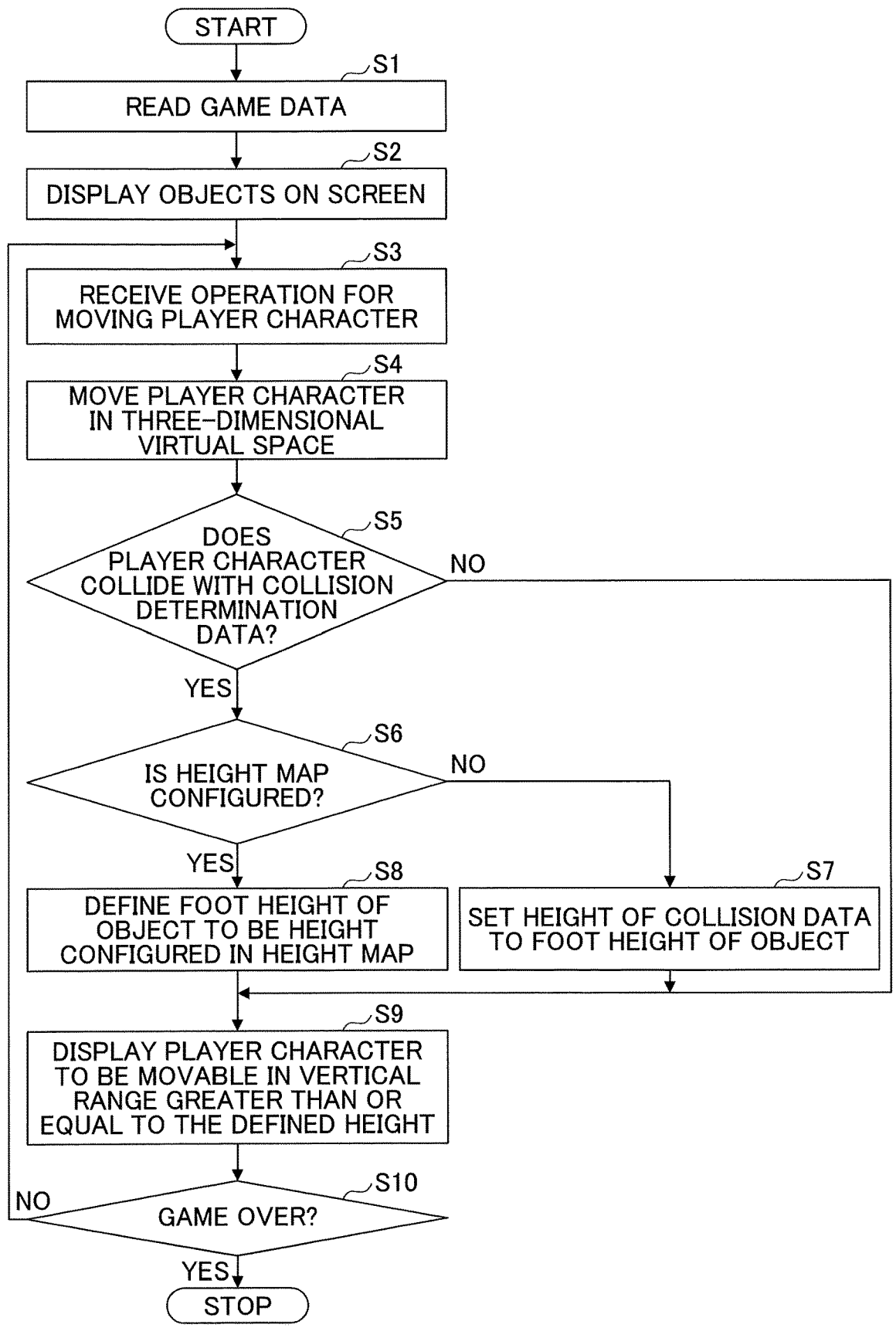
FIG. 3 is a flowchart illustrating an example of a process of the image processing device.
Figure 5A:
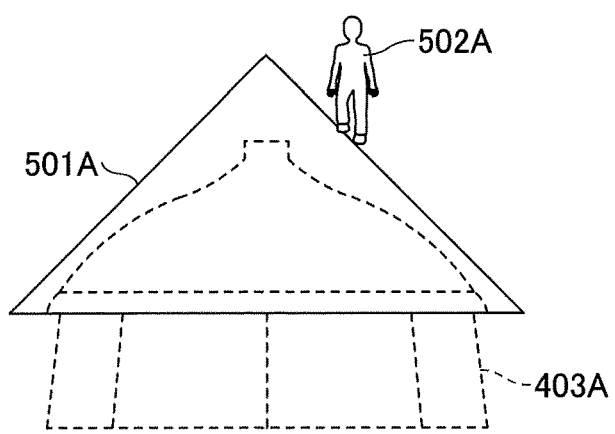
FIG. 5A is a diagram illustrating an example of collision determination data.
Figure 5B:
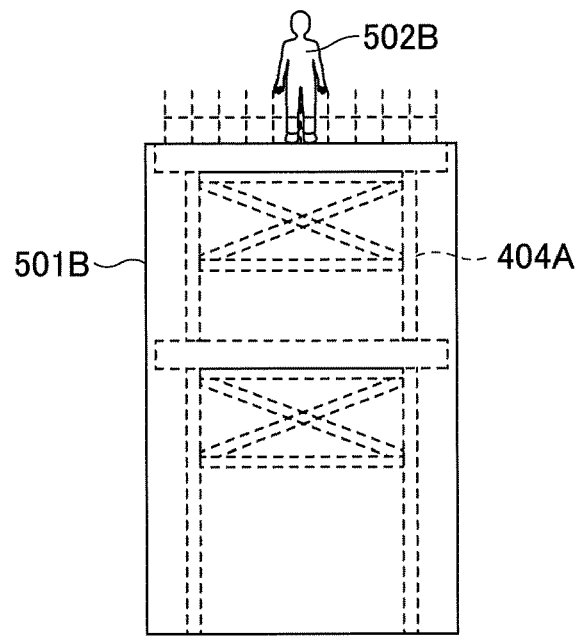
FIG. 5B is a diagram illustrating an example of collision determination data.
Figure 5C:
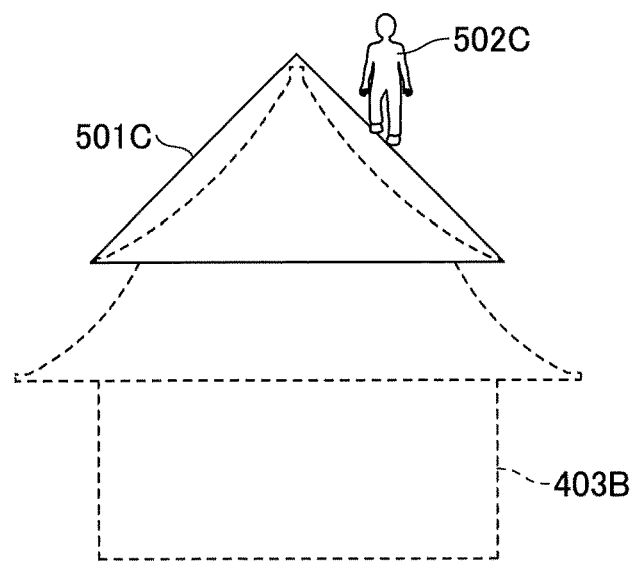
FIG. 5C is a diagram illustrating an example of collision determination data.
Figure 6A:
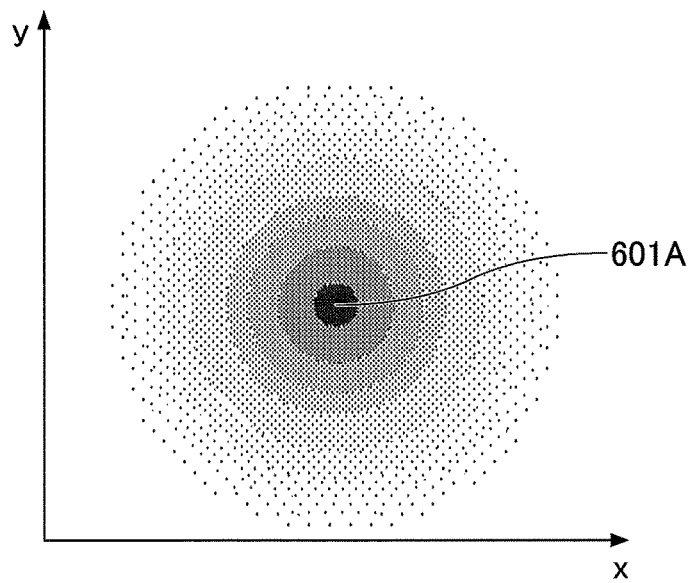
FIG. 6A is a diagram illustrating an example of a height map.
Figure 6B:
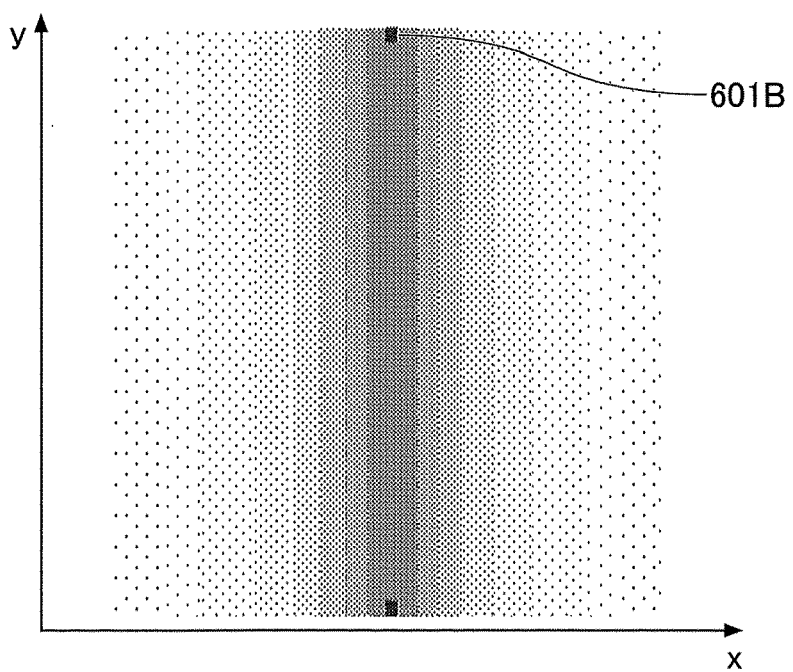
FIG. 6B is a diagram illustrating an example of a height map.
Figure 7A:
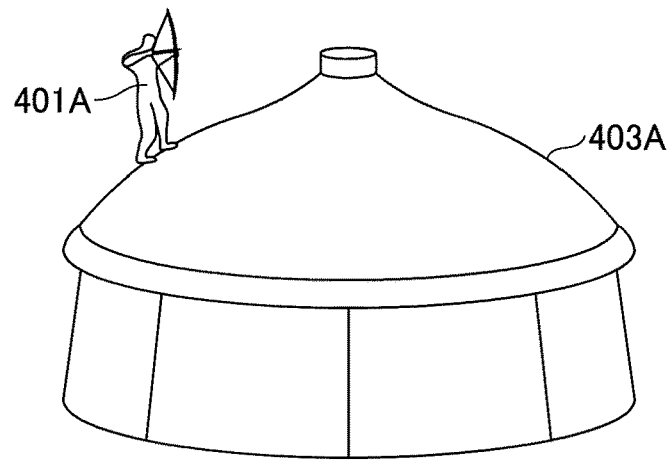
FIG. 7A is a diagram illustrating an example of a display when a player character gets on an object, such as a building.
Figure 7B:
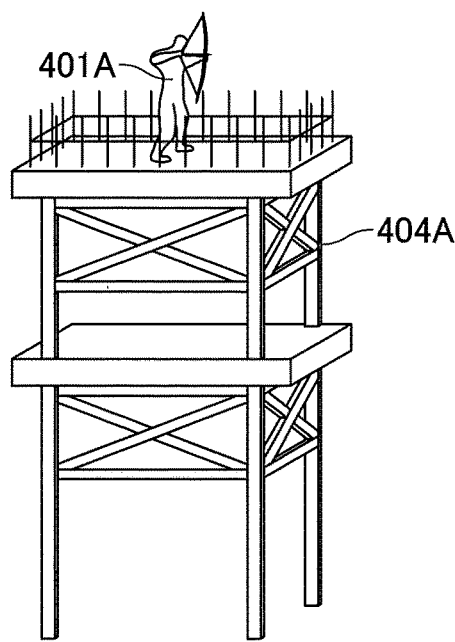
FIG. 7B is a diagram illustrating an example of a display when a player character gets on an object, such as a building.

Next, by referring to FIG. 3 through FIG. 7B, a process executed by the image processing device 10 is described. FIG. 3 is a flowchart illustrating an example of a process executed by the image processing device 10. FIG. 4A and FIG. 4B are diagrams illustrating examples of display screens of three-dimensional data in a game. FIG. 5A, FIG. 5B, and FIG. 5C are diagrams illustrating examples of the collision determination data 112. FIG. 6A and FIG. 6B are diagrams illustrating an example of the height map 113. FIG. 7A and FIG. 7B are diagrams illustrating examples of displays when a player character gets on an object, such as a building.

In the following, an example of an open world game (sandbox, free roaming) is described. In an open world game, in response to movement of a player character operated by a user, the image processing device 10 reads three-dimensional data of a landform, a building, plants, etc., in a vicinity of the player character, and the image processing device 10 displays the three-dimensional data. As a result, a user can cause the player character to seamlessly move the player character in a relatively large world of a virtual three-dimensional space, without switching of a map, etc.

At step S1, in response to detecting that a game is activated by a user's operation, etc., the controller 14 reads data of the game into the memory device 103. The data of the game includes, for example, a current position of a player character in a virtual three-dimensional space, three-dimensional data 111 of each object located within a predetermined range from the position, data for determining a collision that represents a surface of a predetermined three-dimensional object (the collision determination data 112), height map 113, etc. Here, the objects include, for example, a landform, a building, plants, a character, etc.

Figure 4A:
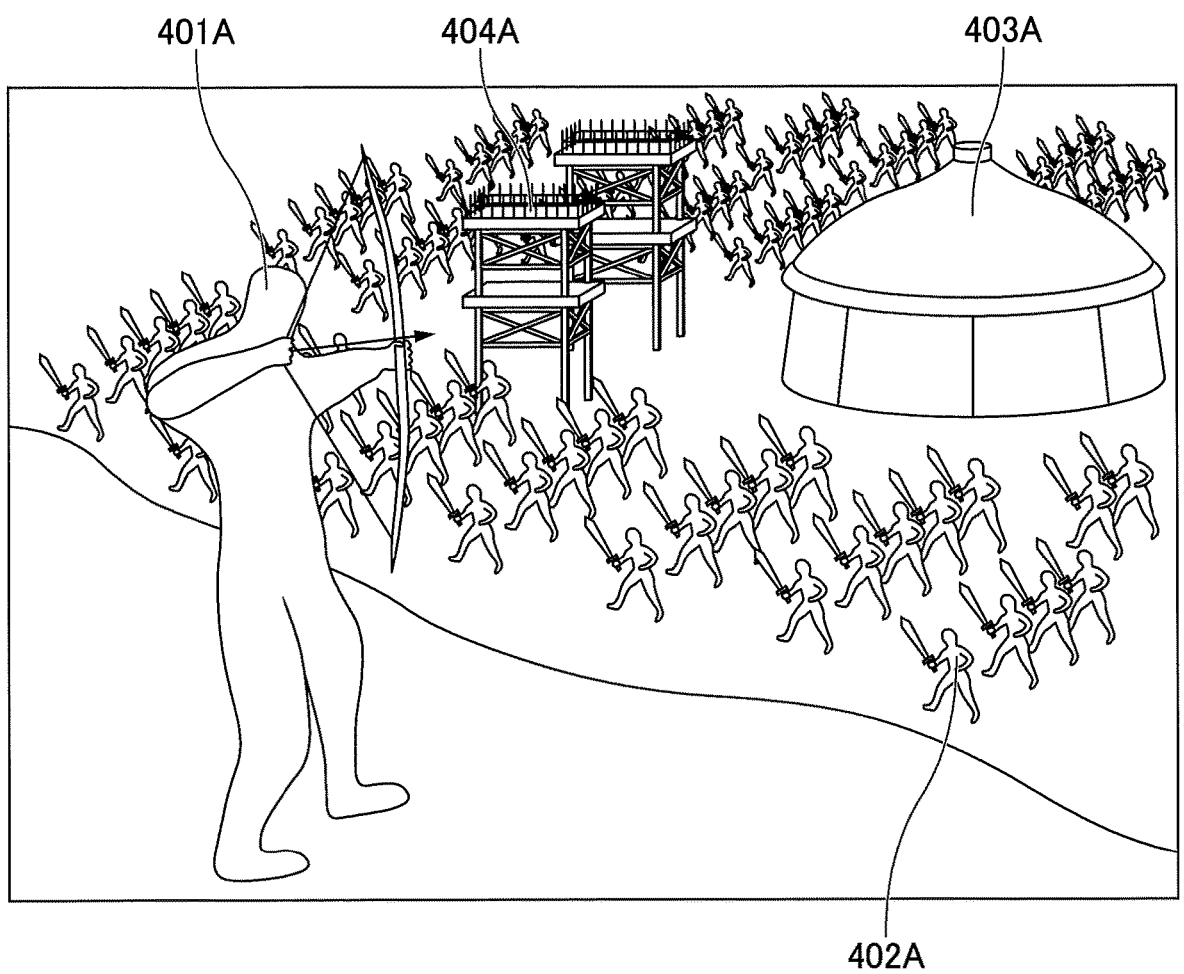
FIG. 4A is a diagram illustrating an example of a display screen of three-dimensional data in a game.
Figure 4B:
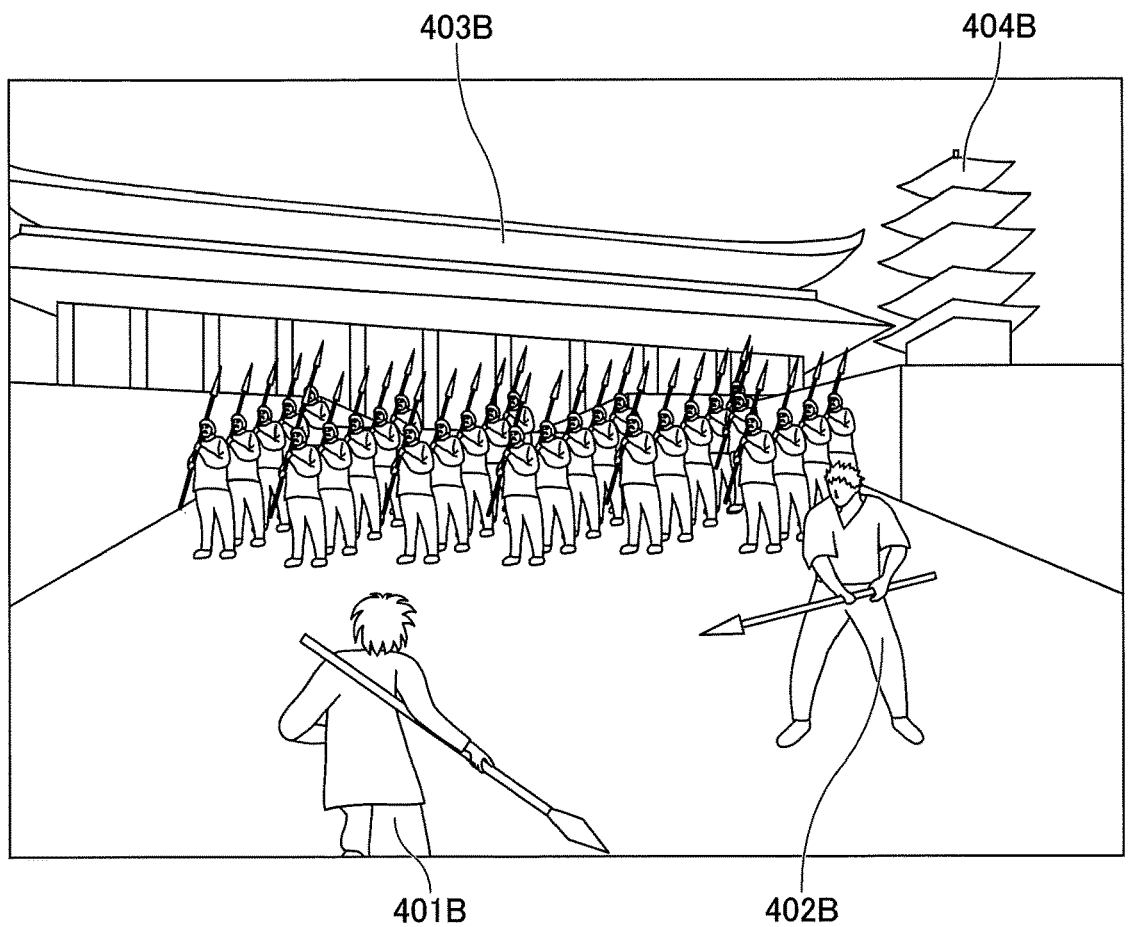
FIG. 4B is a diagram illustrating an example of a display screen of three-dimensional data in a game.

Subsequently, the controller 14 causes the display controller 15 to display each object included in the read three-dimensional data to be displayed on a screen as three-dimensional computer graphics (step S2). Here, an image, such as the image illustrated in FIG. 4A or the image illustrated in FIG. 4B, is displayed by the display controller 15. In the example of FIG. 4A, a user character 401A, an enemy character 402A, a building 403A, a watchtower 404A, etc., are displayed. In the example of FIG. 4B, a user character 401B, an enemy character 402B, a building 403B, a tower 404B, etc., are displayed.

Subsequently, the receiver 12 receives an operation for moving a player character from the user (step S3).

Subsequently, in response to the user's operation, the controller 14 starts moving the player character in the virtual three-dimensional space (step S4). Here, for example, in response to an operation, such as a jump operation by the user, the controller 14 causes the player character to jump and fall under virtual gravity in the virtual three-dimensional space, so that the player character gets on a step or a roof.

Alternatively, in response to an operation, such as a walk operation by the user, the controller 14 causes the player character to walk, so that the player character moves to a step or a roof.

Here, in response to the movement of the position of the player character on the horizontal plane in the virtual three-dimensional space, the controller 14 reads, into the memory, data of an object located within a predetermined range from the position; data of the collision determination data 112 corresponding to the object; and data corresponding to positions within the predetermined range included in the height map 113, which are included in the three-dimensional data 111. For example, at a timing at which a current position of the player character on the horizontal plane is separated by a distance that is greater than or equal to a predetermined distance from a position on the horizontal plane represented by data that has been previously read, the controller 14 reads data that is not stored in the memory, among data items of a region within a predetermined range from the current position. As a result, the player character can seamlessly move around in the world of the virtual three-dimensional space, without switching of a map.

Subsequently, the determiner 13 determines whether the player character collides with collision determination data based on the collision determination data 112 (step S5). The collision determination data 112 includes data of locations of vertexes of three-dimensional objects forming the collision determination data. For example, in the collision determination data 112, data of three-dimensional objects including, at least, a part of each object located in the virtual three-dimensional space, such as a roof of a building, is configured in advance. Note that the collision determination data is data for determining a collision (mutual interference) between a player character and an object, which is used for determining whether the player character gets on an object, such as a building. Here, "collides with the collision determination data" implies that, for example, a lowermost position of an object, such as a foot of a player character, is located within a predetermined range with a height that is less than or equal to a height of the collision determination data.

FIG. 5A depicts positional relation between a location of the foot of the player character 502A and a location of collision determination data 501A when the player character 502A gets on a roof of the building 403A of FIG. 4A, and the location of the foot of the player character 502A collides with the collision determination data 501A that represents a position of a surface of a three-dimensional object, such as a cone, included in the collision determination data 112.

FIG. 5B depicts positional relation between a location of the foot of the player character 502B and a location of collision determination data 501B when the player character 502B gets on a roof of the watchtower 404A of FIG. 4A, and the location of the foot of the player character 502B collides with the collision determination data 501B that represents a position of a surface of a three-dimensional object, such as a polyhedron (e.g., a square pole), included in the collision determination data 112.

FIG. 5C depicts positional relation between a location of the foot of the player character 502C and a location of collision determination data 501C when the player character 502C gets on a roof of the tower 404B of FIG. 4B, and the location of the foot of the player character 502C collides with the collision determination data 501C that represents a position of a surface of a three-dimensional object, such as a polyhedron (e.g., a triangle pole), included in the collision determination data 112.

If the player character does not collide with the collision determination data (NO at step S5), the process proceeds to the process of step S9, which is described below.

If the player character collides with the collision determination data (YES at step S5), the determiner 13 determines whether data of the height map 113 is configured for the current position of the player character in the virtual three-dimensional space (step S6).

If data of the height map 113 is not configured for the current position of the player character in the virtual three-dimensional space (NO at step S6), the determiner 13 sets the height of the lowermost position of the object (ground height, feet height) to the height of the lowermost position of the object.

If data of the height map 113 is configured for the current position of the player character in the virtual three-dimensional space (YES at step S6), the determiner 13 sets the height of the lowermost position of the object to the height defined in the height map 113 for the current position of the player character in the virtual three-dimensional space (step S8). Namely, for the current position of the player character in the virtual three-dimensional space, a lower limit value of a vertical range in which the player character (object) can be moved is set to the height defined in the height map 113.

FIG. 6A shows an example of the height map 113 of the roof of the building 403A of FIG. 4A. FIG. 6B shows an example of the height map 113 of the roof of a building 403B of FIG. 4B. In the example of FIG. 6A and the example of FIG. 6B, a horizontal direction in the virtual three-dimensional space is indicated by an X-axis, and a depth direction in the virtual three-dimensional space is indicated by a Y-axis. As the value of the height, which is a position in a vertical direction in the virtual three-dimensional space, becomes greater, the display of the position becomes denser (i.e., the large height is indicated by denser dots in FIG. 6A and FIG. 6B). In the example of FIG. 6A, the position 601A is densely displayed because the height of the position 601A of an ornament portion on the roof is relatively large. Similarly, in the example of FIG. 6B, the position 601B is densely displayed because the height of the position 601B of an ornament portion of the roof is relatively large.

Subsequently, the controller 14 configures the player character to be movable in the virtual three-dimensional space within a range with a height that is greater than or equal to the height determined by the determiner 13, and the controller 14 causes the display controller 15 to display the player character on the screen (step S9). Here, when the player character is not moving, the controller 14 causes the display controller 15 to display the player character on the screen, so that the foot height of the player character matches the height determined by the determiner 13. When the player character performs an action, such as jumping, the controller 14 causes the display controller 15 to display the player character on the screen, so that the player character jumps in accordance with the virtual gravity, while the foot height of the player character is within a vertical range that is greater than or equal to the height determined by the determiner 13.

FIG. 7A shows a position of the player character when the player character gets on the roof of the building 403A of FIG. 4A. In the example of FIG. 7A, the player character is displayed, while the height of the roof of the building 403A of FIG. 4A, which has a slightly complicated shape, matches the foot height of the player character.

FIG. 7B shows a position of the player character when the player character gets on the watchtower 404A of FIG. 4A. In the example of FIG. 7B, the player character is displayed, while the height of the top surface of the watchtower 404A of FIG. 4A, which is a flat surface, matches the foot height of the player character.

Subsequently, the controller 14 determines whether to end the game based on a user's operation, etc. (step S10). If it is determined not to end the game (NO at step S10), the process proceeds to step S3. If it is determined to end the game (YES at step S10), the process is terminated.

Effects

In an open world game in which a player character can freely move around a world in an extended virtual three-dimensional space, when the player character views a landscape of a neighborhood from a high position, large-scale video representation is possible. In this case, it is desirable to display, not only objects in a vicinity, such as buildings and trees, but also objects located far away as much as possible, from perspective of a realistic sensation.

Accordingly, for an open world game, a data amount of objects, etc., to be read into the memory is large, and a load on a process for displaying the objects, etc., is large, compared to a game, which is not an open world game, such that, after reaching an end of an individual space, the space is switched to another space.

There is an upper limit for a memory size and an upper limit for processing speed of the CPU, etc., which depend on the hardware performance of the game device. If the player character gets on an object, such as a building, and a determination of the foot height of the player character is made based on the calculation using a three-dimensional model of the object, such as that of related art, a processing load becomes relatively large.

Accordingly, in the related art, for example, for three-dimensional computer graphics with a relatively high processing load due to a large number of objects to be displayed, such as an open world game, it may be required to reduce the number of the objects to be displayed.

In contrast, according to the above-described embodiment, if a top surface of an object to be gotten on is a part of a surface of a polyhedron, a cone, or a column, by obtaining the height relatively easily using the collision determination data representing a surface of a three-dimensional object, the lowermost position of an object (e.g., a player character), i.e., a lower limit value of a vertical range in which the object can be moved, can be relatively accurately determined, while reducing a processing load on the memory and the processor. Additionally, if a top surface of an object to be gotten on has a complicated shape due to an ornament, such as roof tiles, that may not be represented by a surface of a polyhedron, by obtaining the height using a local height map corresponding to the position of the object, the lowermost position of an object, i.e., a lower limit value of a vertical range in which the object can be moved, can be relatively accurately determined, while reducing a processing load on the memory and the processor.

CONCLUSION

According to the above-described embodiments, if a height of a lowermost position of a predetermined object, such as a player character, is less than or equal to a height of a surface of a predetermined three-dimensional object, the predetermined object is configured to be movable in a range that is higher than or equal to a predetermined height defined in advance. As a result, the lowermost position of the object can be relatively accurately determined while reducing a processing load.

The embodiments of the present disclosure are described in detail above. However, the present invention is not limited to the specific embodiments, and various modifications and alterations may be made within the gist of the present invention described in the claims.

Each functional unit of the image processing device 10 may be implemented by cloud computing formed of, for example, at least one computer. Alternatively or additionally, the image processing device 10 may be a server for on-line games, which displays a game screen on a user's terminal.

In the above-described embodiments, the example of the open world game is described. However, examples to which the disclosed technique is applied is not limited to the open world game. For example, the disclosed technique can be applied to a case in which a predetermined object is placed on another object in a virtual three-dimensional space in three-dimensional computer graphics, such as a game other than the open world game, or a simulation.

What is claimed is:

1. A non-transitory computer readable storage medium storing an image processing program, which when executed causing an image processing device to execute the following steps:
receiving an operation for moving a position of a predetermined object in a virtual three-dimensional space;
in response to determining that a height of a lowermost part of the predetermined object is less than a height of a surface of a predetermined three-dimensional object, configuring the predetermined object to be movable in a range with a height that is greater than or equal to a height based on collision determination data or a height based on a height map corresponding to the position on a horizontal plane in the virtual three-dimensional space; and
causing the predetermined object to be displayed on or above another object in the virtual three-dimensional space,
wherein, in response to detecting, by the image processing device, that the height based on the height map is defined corresponding to the position on the horizontal plane, the step of configuring configures the predetermined object to be movable in the range with the height that is greater than or equal to the height based on the height map, and
wherein, in response to detecting, by the image processing device, that the height based on the height map is not defined corresponding to the position on the horizontal plane, the step of configuring configures the predetermined object to be movable in a range with a height that is greater than or equal to the height based on the collision determination data.

2. The non-transitory computer readable storage medium according to claim 1, wherein the step of configuring causes the predetei mined object to move in accordance with virtual gravity.

3. The non-transitory computer readable storage medium according to claim 1, wherein the predetermined three-dimensional object is at least one of a polyhedron, a cone, and a column corresponding to at least a part of the other object located in the virtual three-dimensional space.

4. The non-transitory computer readable storage medium according to claim 1, wherein the steps executed by the image processing device further include, in response to movement of the position of the predetermined object on the horizontal plane, reading, into a memory, three-dimensional data of an. object located within a predetermined range from the position; data representing the surface of the predetermined three-dimensional object corresponding to the object; and data representing the predetermined height within the predetermined range, and wherein the step of configuring determines the height of the range based on the collision determination data or the height map.

5. An image processing method executed by an image processing device, the method comprising:

receiving, by the image processing device, an operation for moving a position of a predetermined object in a virtual three-dimensional space;

in response to determining, by the image processing device, that a height of a lowermost part of the predetermined object is less than a height of a surface of a predetermined three-dimensional object, configuring, by the image processing device, the predetermined object to be movable in a range with a height that is greater than or equal to a height based on collision determination. data or a height based on a height map corresponding to the position on a horizontal plane in the virtual three-dimensional space; and causing, by the image processing device, the predetermined object to be displayed on or above another object in the virtual three-dimensional space, wherein, in response to detecting, by the image processing device, that the height based on the height map is defined corresponding to the position on the horizontal plane, the configuring configures the predetermined object to be movable in the range with the height that is greater than or equal to the height based on the height map, and wherein, in response to detecting, by the image processing device, that the height based on the height map is not defined corresponding to the position on the horizontal plane, the configuring configures the predetermined object to be movable in a range with a height that is greater than or equal to the height based on the collision determination data.

6. An image processing device comprising:

a processor; and a memory that includes instructions, which when executed cause the processor to execute the following steps:

receiving an operation for moving a position of a predetermined object in a virtual three-dimensional space;

in response to determining that a height of a lowermost part of the predetermined object is less than a height of a surface of a predetermined three-dimensional object, configuring the predetermined object to be movable in a range with a height that is greater than or equal to a height based on collision determination data or a height based on a height map corresponding to the position on a horizontal plane in the virtual three-dimensional space; and causing the predetermined object to be displayed on or above another object in the virtual three-dimensional space, wherein, in response to detecting that he height based on the height map is defined corresponding to the position on the horizontal plane, the configuring configures the predetermined object to be movable in the range with the height that is greater than or equal to the height based on the height map, and wherein, in response to detecting that the height based on the height map is not defined corresponding to the position on the horizontal plane, the configuring configures the predetermined object to be movable in a range with a height that is greater than or equal to the height based on the collision determination data.

* * * * *